(12) United States Patent
Pang

(10) Patent No.: US 10,977,569 B2
(45) Date of Patent: Apr. 13, 2021

(54) VISUALIZATION OF ANOMALIES IN TIME SERIES DATA

(71) Applicant: VMware, Inc., Palo Alto, CA (US)

(72) Inventor: Clement Pang, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/109,364

(22) Filed: Aug. 22, 2018

(65) Prior Publication Data

US 2020/0035001 A1    Jan. 30, 2020

Related U.S. Application Data

(60) Provisional application No. 62/711,263, filed on Jul. 27, 2018.

(51) Int. Cl.
| | |
|---|---|
| *G06T 11/20* | (2006.01) |
| *G06T 11/00* | (2006.01) |
| *G06F 3/048* | (2013.01) |
| *G06F 16/23* | (2019.01) |
| *G09G 5/02* | (2006.01) |
| *G06Q 10/00* | (2012.01) |
| *G06Q 10/06* | (2012.01) |
| *G06N 5/04* | (2006.01) |
| *G06F 16/2458* | (2019.01) |

(52) U.S. Cl.
CPC ......... *G06N 5/048* (2013.01); *G06F 16/2477* (2019.01); *G06T 11/001* (2013.01); *G06T 11/206* (2013.01); *G06T 2200/24* (2013.01)

(58) Field of Classification Search
CPC combination set(s) only.
See application file for complete search history.

(56) References Cited

U.S. PATENT DOCUMENTS

| | | | |
|---|---|---|---|
| 7,310,590 B1 * | 12/2007 | Bansal | G06F 11/0715 702/181 |
| 9,437,022 B2 * | 9/2016 | Vander Broek | G06Q 30/0201 |
| 2008/0235075 A1 * | 9/2008 | Couture | G06F 11/3438 709/224 |
| 2010/0030544 A1 * | 2/2010 | Gopalan | H04L 47/127 703/13 |
| 2010/0287146 A1 * | 11/2010 | Skelton | G06F 16/2453 707/705 |
| 2011/0054295 A1 * | 3/2011 | Masumoto | A61B 5/055 600/407 |
| 2011/0119100 A1 * | 5/2011 | Ruhl | G06Q 10/06 705/7.11 |
| 2011/0119374 A1 * | 5/2011 | Ruhl | H04L 43/04 709/224 |
| 2014/0012901 A1 * | 1/2014 | Ruhl | G06Q 10/06 709/203 |

(Continued)

*Primary Examiner* — Wesner Sajous

(57) ABSTRACT

In a computer-implemented method for visualization of anomalies in time series data on a graphical user interface, a plurality of time series data is dynamically displayed in a graph of the graphical user interface, the plurality of time series data including data points represented as numerical measurements. An indication that a time series data of the plurality of time series data includes an anomaly is received. Responsive to receiving the indication that the time series data of the plurality of time series data includes an anomaly, a visualization of at least a region of the time series data including the anomaly is changed.

17 Claims, 12 Drawing Sheets

(56) References Cited

U.S. PATENT DOCUMENTS

| | | | | |
|---|---|---|---|---|
| 2014/0040180 A1* | 2/2014 | Ruhl | .................... | G06F 16/958 |
| | | | | 706/52 |
| 2015/0213631 A1* | 7/2015 | Vander Broek | ..... | G06F 16/2477 |
| | | | | 345/589 |
| 2016/0062950 A1* | 3/2016 | Brodersen | ............... | G06F 17/18 |
| | | | | 702/181 |
| 2019/0155672 A1* | 5/2019 | Wang | .................. | G06F 11/0751 |
| 2019/0236177 A1* | 8/2019 | Jain | ..................... | G06F 16/2365 |
| 2020/0034733 A1* | 1/2020 | Pang | .................... | G06T 11/001 |

\* cited by examiner

VISUALIZATION OF ANOMALIES IN TIME SERIES DATA

RELATED APPLICATION

This application claims priority to the provisional patent application having Application No. 62/711,263, entitled "ANOMALY DETECTION ON TIME SERIES DATA," with filing date Jul. 27, 2018, by Clement Pang, and assigned to the assignee of the present application, the disclosure of which is hereby incorporated herein by reference in its entirety.

BACKGROUND

Management, monitoring, and troubleshooting in dynamic environments, both cloud-based and on-premises products, is increasingly important as the popularity of such products continues to grow. As the quantities of time-sensitive data grow, conventional techniques are increasingly deficient in the management of these applications. Conventional techniques, such as relational databases, have difficulty managing large quantities of data and have limited scalability. Moreover, as monitoring analytics of these large quantities of data often have real-time requirements, the deficiencies of reliance on relational databases become more pronounced.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Figure 1:
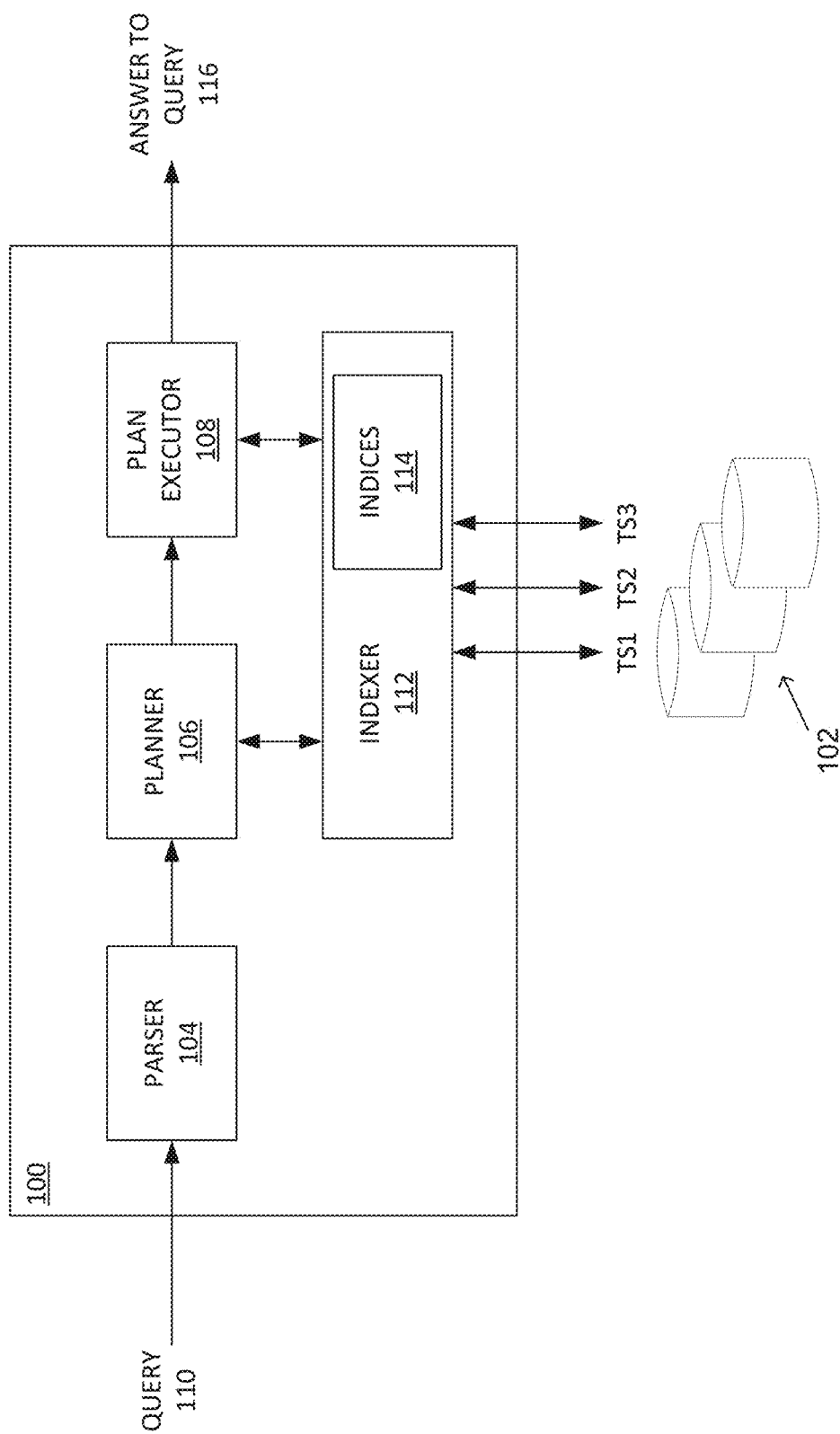
FIG. 1 is a block diagram illustrating a system for managing data including responding to a query regarding time series data, in accordance with embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "accessing," "applying," "comparing," "determining," "identifying," "forecasting," "generating," "performing," "displaying," "changing," "receiving," "colorizing," "reverting," or the like, refer to the actions and processes of an electronic computing device or system such as: a host processor, a processor, a memory, a cloud-computing environment, a hyper-converged appliance, a software defined network (SDN) manager, a system manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

OVERVIEW OF DISCUSSION

Example embodiments described herein improve the performance of computer systems by performing anomaly detection on time series data. In various embodiments, a computer-implemented method for anomaly detection on time series data is provided. Time series data is accessed. A forecasting algorithm is applied to at least a portion of the time series data to generate a forecast confidence band for a time window following the at least a portion of the time series data. The forecast confidence band for the time window is compared to the time series data of the time window. It is determined whether the time series data includes an anomaly based at least in part on the comparing.

Other example embodiments described herein improve the performance of computer systems by providing for the visualization of anomalies in time series data on a graphical user interface. In various embodiments, a plurality of time series data is dynamically displayed in a graph of the graphical user interface, where the plurality of time series data includes data points represented as numerical measurements. An indication that a time series data of the plurality of time series data includes an anomaly is received. Responsive to receiving the indication that the time series data of the plurality of time series data includes an anomaly, a visualization of at least a region of the time series data including the anomaly is changed.

A numerical measurement of a system or activity can be collected and stored as a metric (also referred to as a "stream"). For example, one type of stream is a CPU load measured over time. Operations can be performed on data points in a stream. In some instances, the operations can be performed in real time as data points are received. In other instances, the operations can be performed on historical data. Metrics analysis include a variety of use cases including online services (e.g., access to applications), software development, energy, Internet of Things (IoT), financial services (e.g., payment processing), healthcare, manufacturing, retail, operations management, and the like. Time series data refers to data that includes an indication of the time the data was collected and/or stored (e.g., a timestamp).

Time series data can provide powerful insights into the performance of a system. The monitoring and analysis of time series data can provide large amounts of data for analysis. Due to volume of time series data typically received, as well as the frequency of receipt of the time series data, analysis of the data can be challenging. Embodiments described herein provide for improved analysis of the data by comparing received data to a data forecast for performing automated anomaly detection.

In accordance with various embodiments, time series data is accessed. It should be appreciated that the time series data can be accessed as it is received (e.g., at ingestion) or can be historical time series data (e.g., stored). In some embodiments, the time series data is manipulated to provide a key performance indicator (KPI) or a chart that exhibits seasonality (e.g., stable or changing).

A forecasting algorithm is applied to time series data. Forecasting is the process of predicting future points of time series data based on historical time series data. For purposes of the present application, it should be appreciated that forecasting can be performed on the time series data at ingestion or using stored time series data. For instance, in some embodiments, forecasting can be applied to a portion of stored time series data while hiding another portion of time series data from the forecasting algorithm. Hidden data can then be compared to the forecasting results to perform the described anomaly detection.

It should further be appreciated that the described embodiments can utilize any forecasting algorithm or method that is capable of generating a confidence band including a lower bound and an upper bound. Examples of such forecasting algorithms include, without limitation: autoregressive integrated moving average (ARIMA), exponential smoothing, Holt-Winters triple exponential smoothing, fast Fourier transform, etc. In some embodiments, the forecasting algorithm is performed according to a selected confidence interval (e.g., 0.95 or 0.99) and amount of backtesting. Backtesting refers to the amount of historical or prior data to incorporate into the forecasting algorithm.

A forecast confidence band is generated for a time window after the portion of time series data for which the forecasting algorithm was applied. The actual time series data for the time window is then compared to the forecast confidence band for the time window. As presented above, the actual time series data may also be stored or may be compared upon receipt. Based on the comparison, it is determined whether the time series data includes an anomaly.

In some embodiments, a percentage of points of the time series data falling outside the forecast confidence band for the time window is determined. For example, the percentage can vary from 0.0 to 1.0, where 1.0 indicates that all points are anomalous. The percentage of points of the time series data falling outside the forecast confidence band can then be compared to a threshold percentage. If the percentage of points outside the bands exceeds the threshold percentage, the method identifies an anomaly of the time series data for the time window. For example, if 80% of the points are anomalous for a 5 minute time window, an anomaly is detected.

It should be appreciated that the forecasting algorithm can be applied to a plurality of portions of the time series data. In some embodiments, the time window following each of the plurality of portions of the time series data has a constant length. The method can periodically apply the forecasting algorithm to a time window following a portion of the time series data. The portions of time series data for which the forecasting algorithm is applied can overlap temporally. For example, the forecasting algorithm can be applied to 7 days of time series data preceding a 10 minute time window every 15 seconds. Each of these operations will generate a forecast confidence band, which is then compared to the actual time series data received for the corresponding time window. If the actual data varies too much compared to the forecast confidence band (e.g., satisfies a percentage threshold), the method automatically identifies an anomaly.

In various embodiments, responsive to determining that the times series data includes an anomaly, an alert is generated. In some embodiments, a visualization of the time series data is presented, where the visualization may include a plurality of different time series data. In order to highlight time series data, or a region of time series data, which is determined to be anomalous, in some embodiments, the visualization of at least a region of the time series data including the anomaly is changed.

In one embodiment, at least the region of the time series data including the anomaly is colorized, where the colors of the individual lines of time series data not including an anomaly are suppressed (e.g., converted to gray scale, muted, etc.) As such, only the region or regions of time series data identified as anomalous are colored, allowing for efficient and specific identification of time series data for further analysis. In some embodiments, as the anomalies are addressed and the time series data becomes non-anomalous, the visualization of the time series data is reverted such that the color of the lines is suppressed (e.g., colorization is removed).

As presented above, systems for analyzing time series data typically process very large amounts of data, such that it can be very difficult to perform anomaly detection. Providing colorization of anomalous regions of time series data allows for easy identification of such anomalies, speeding up anomaly resolution, thereby improving the performance of the overall system. Hence, the embodiments of the present invention greatly extend beyond conventional methods of anomaly detection of time series data. Moreover, embodiments of the present invention amount to significantly more than merely using a computer to perform anomaly detection of time series data and visualization of the detected anomaly. Instead, embodiments of the present invention specifically recite a novel process, rooted in computer technology, utilizing a forecasting algorithm to compare actual time series data to a forecast of time series data to overcome a problem specifically arising in the realm of monitoring time series data within computer systems. Other embodiments of the present invention specifically recite a novel process, rooted in computer technology, for providing a visualization of anomalous regions within time series data to overcome a problem specifically arising in the realm of monitoring time series data within computer systems.

Example System for Query Plan Generation

FIG. 1 is a block diagram illustrating an embodiment of a system 100 for managing data including performing a novel process of anomaly detection on time series data which is necessarily rooted in computer technology to overcome a problem specifically arising in the realm of the analysis of time series data for computer systems. In one embodiment, system 100 generates a query plan for the time series data based on the query 110. System 100 includes a parser 104, a planner 106, and an executor 108. System 100 can be implemented by a query execution engine configured to parse a query at parser 104, produce a query execution plan at planner 106, fetch time series data and run the time series data through processing operations, and determine an answer or response to the query at executor 108.

In the example shown in FIG. 1, a query 110 is received. In one embodiment, the query 110 is provided by a user via a client. Time series data is provided by storage devices 102. The storage devices 102 store and output time series data, e.g., TS1, TS2, TS3, etc. In various embodiments, the storage devices 102 include a storage system such as time series database (TSDB). The data can include times series data, which may be discrete or continuous. For example, the data can include live data fed to a discrete stream, e.g., for a standing query. Continuous sources can include analog output representing a value as a function of time. With respect to processing operations, continuous data may be time sensitive, e.g., reacting to a declared time at which a unit of stream processing is attempted, or a constant, e.g., a 5V signal. Discrete streams can be provided to the processing operations in timestamp order. It should be appreciated that the time series data may be queried in real-time (e.g., by accessing the live data stream) or offline processing (e.g., by accessing the stored time series data).

In some embodiments, time series data includes a numerical measurement of a system or activity that can be collected and stored as a metric (also referred to as a "stream"). For example, one type of metric is a CPU load measured over time. Other examples include, service uptime, memory usage, etc. It should be appreciated that metrics can be collected for any type of measurable performance of a system or activity. Operations can be performed on data points in a stream. In some instances, the operations can be performed in real time as data points are received. In other instances, the operations can be performed on historical data. Metrics analysis include a variety of use cases including online services (e.g., access to applications), software development, energy, Internet of Things (IoT), financial services (e.g., payment processing), healthcare, manufacturing, retail, operations management, and the like. It should be appreciated that the preceding examples are non-limiting, and that metrics analysis can be utilized in many different types of use cases and applications.

In accordance with some embodiments, a data point in a stream (e.g., in a metric) includes a name, a source, a value, and a time stamp. Optionally, a data point can include one or more tags (e.g., point tags). For example, a data point for a metric may include:
  A name—the name of the metric (e.g., CPU_idle, service.uptime)
  A source—the name of an application, host, container, instance, or other entity generating the metric (e.g., web_server_1, app1, app2)
  A value—the value of the metric (e.g., 99% idle, 1000, 2000)
  A timestamp—the timestamp of the metric (e.g., 1418436586000)
  One or more point tags (optional)—custom metadata associated with the metric (e.g., location=las_vegas, environment=prod)

Time series data is received at indexer 112 for generating indices 114. Time series data is collected and sorted into a plurality of indices 114 to facilitate retrieval of the source time series data (e.g., which data stream to access or which data store to access). It should be appreciated that indexer 112 can generate many different types of indices 114 for facilitating data retrieval. For example, indices 114 can include one or more of a prefix index, a trigram index, a two-tier index, and a three-tier index. A prefix index is an index that includes prefixes of searchable terms. A trigram index is an index that includes three letter combinations of searchable terms. A two-tier index is an index that relates two searchable dimensions (e.g., metric to host or host to metric). A three-tier index is an index that relates three searchable dimensions (e.g., metric to host to point tag or host to metric to point tag).

Query 110 is received for searching the time series data. A query can include elements that define searchable parameters of the time series data. For example, the query can include elements defining terms related to metrics, sources, values, timestamps, and/or point tags for isolating and returning relevant results. The parser 104 receives a query 110 and parses the query for a predicate (e.g., elements and operators). The predicate forms at least part of a basis for generating a query plan. For instance, consider the example query:
  ts("*graf*", host="*2*" and tag=app and (status=production or role=app) and cluster=mon and cpu=cpu-total)

The example query is parsed into the predicate including the elements and operators:
  metric="*graf*" AND
  host="*2*" AND
  (status=production OR role=app) AND
  cluster=mon AND
  cpu=cpu-total The planner 106 receives the parsed elements and operators of query 110 and generates a query plan for retrieval of relevant time series data that resolves the query 110. The planner 106 determines operations to be performed on the relevant time series data to retrieve a result of the query 110.

In operation, the system 100 receives a query. Planner 106 generates a query plan for determining what to retrieve from time series databases 102 based on the query. For example, planner 106 determines how many scans to make on the time series database(s). The planner 106 then hands off commands (e.g., a query plan) to executor 108 to perform an execution phase, e.g., beginning execution of the query 110. The executor 108 then outputs an answer to the query. Although shown as a single stream, the answer to the query can include one or more streams.

System 100 is also operable to perform anomaly detection on the time series data by combining the time series databases 102 with the use of a forecasting algorithm. Forecasting is the process of predicting future points of time series data based on historical time series data. For purposes of the present application, it should be appreciated that forecasting can be performed on the time series data at ingestion or using stored time series data. For instance, in some embodiments, forecasting can be applied to a portion of time series data while hiding another portion of time series data from the forecasting algorithm. Hidden data can then be compared to the forecasting results to perform the described anomaly detection.

It should further be appreciated that the described embodiments can utilize any forecasting algorithm or method that is capable of generating a confidence band including a lower bound and an upper bound. Examples of such forecasting algorithms include, without limitation: autoregressive integrated moving average (ARIMA), exponential smoothing, Holt-Winters triple exponential smoothing, fast Fourier transform, etc.

With reference to FIG. 1, the executor 108 handles an "execution phase" in which operations are performed on time series data to generate an answer to the query. In various embodiments, the executor 108 executes a query plan 202 from planner 106 and performs operations on the time series data based on the query plan, where the query plan includes a path of execution for resolving query 110. For example, one or more executors can perform the operation on the time series data concurrently. In various embodiments, the executor 108 responds to a query about the time series data and outputs an answer 116 to the query. Although shown as separate components in FIG. 1, the planner 106 and the executor 108 can be implemented as a single component. The techniques described herein can be performed by the planner 106 and/or the executor 108.

Figure 2:
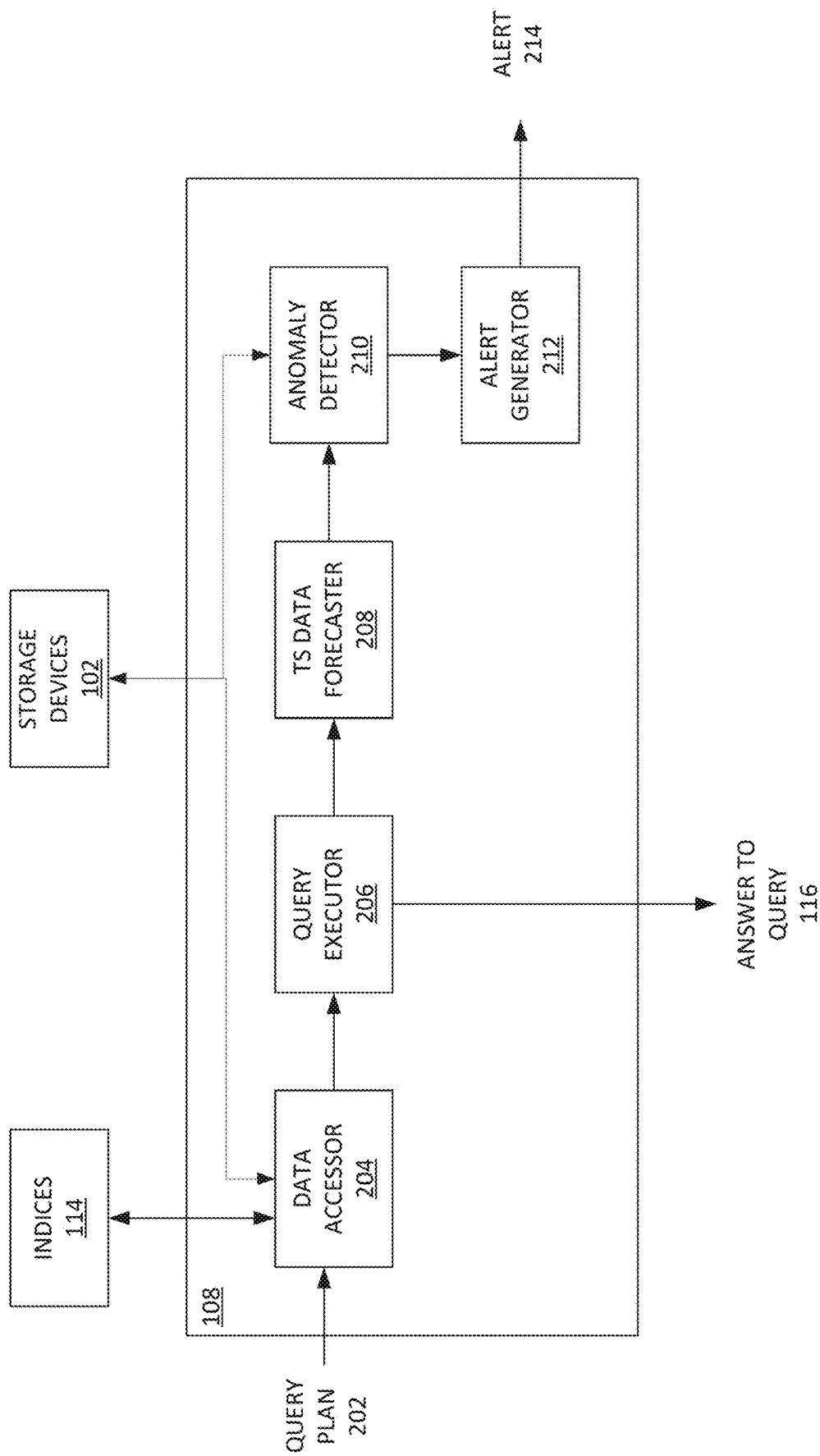
FIG. 2 is a block diagram illustrating a plan executor for executing a query plan including performing anomaly detection on time series data, in accordance with embodiments.

FIG. 2 is a block diagram illustrating an embodiment of executor 108 for executing a query plan and for performing anomaly detection. In one embodiment, executor 108 receives a query plan, where the query plan includes a request or command to perform anomaly detection. In one embodiment, the query plan also includes operations for manipulating the time series data into a key performance indicator (KPI) or a chart that exhibits seasonality (stable or changing variance). Data accessor 204 accesses the time series data for which anomaly detection is to be performed using indices 114 and storage devices 102. Query executor 206, in some embodiments, executes the query plan and provides answer 116 to the query.

Time series data forecaster 208 receives time series data (e.g., from data accessor 204 or query executor 206) and applies a forecasting algorithm to the time series data. A forecasting algorithm is applied to time series data. Forecasting is the process of predicting future points of time series data based on historical time series data. For purposes of the present application, it should be appreciated that forecasting can be performed on the time series data at ingestion or using stored time series data. For instance, in some embodiments, forecasting can be applied to a portion of stored time series data while hiding another portion of time series data from the forecasting algorithm. Hidden data can then be compared to the forecasting results to perform the described anomaly detection.

It should further be appreciated that the described embodiments can utilize any forecasting algorithm or method that is capable of generating a confidence band including a lower bound and an upper bound. Examples of such forecasting algorithms include, without limitation: autoregressive integrated moving average (ARIMA), exponential smoothing, Holt-Winters triple exponential smoothing, fast Fourier transform, etc. In some embodiments, the forecasting algorithm is performed according to a selected confidence interval (e.g., 0.95 or 0.99) and amount of backtesting. Backtesting refers to the amount of historical or prior data to incorporate into the forecasting algorithm.

Time series data forecaster 208 generates a forecast confidence band for a time window after the portion of time series data for which the forecasting algorithm was applied. Anomaly detector 210 compares the actual time series data for the time window to the forecast confidence band for the time window. As presented above, the actual time series data may also be stored or may be compared upon receipt. Based on the comparison, it is determined whether the time series data includes an anomaly.

Figure 4:
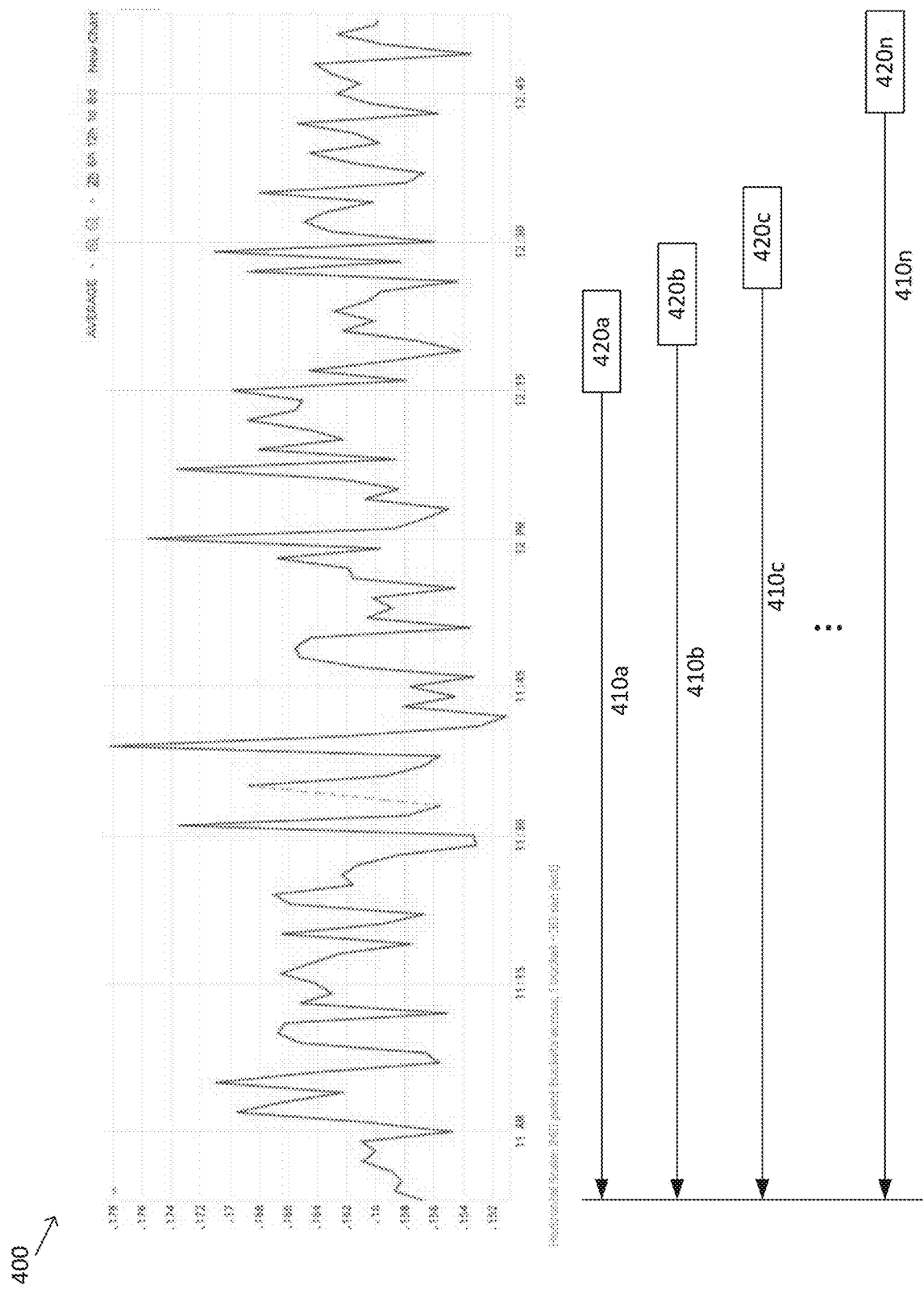
FIG. 4 is a graph of example time series data illustrating portions of the time series data used for forecasting of the time series data, in accordance with embodiments.

FIG. 4 is a graph 400 of example time series data illustrating portions of the time series data used for forecasting of the time series data, in accordance with embodiments. As illustrated, a forecasting algorithm is applied to portions 410a, 410b, and 410c through 410n of time series data. Each portion of time series data is associated with a time window 420a through 420n, respectively. As illustrated, time windows 420a through 420n are ten minutes in duration, and are temporally offset by five minutes. The portions include an amount of historical data preceding the time windows 420a through 420n.

Figure 5:
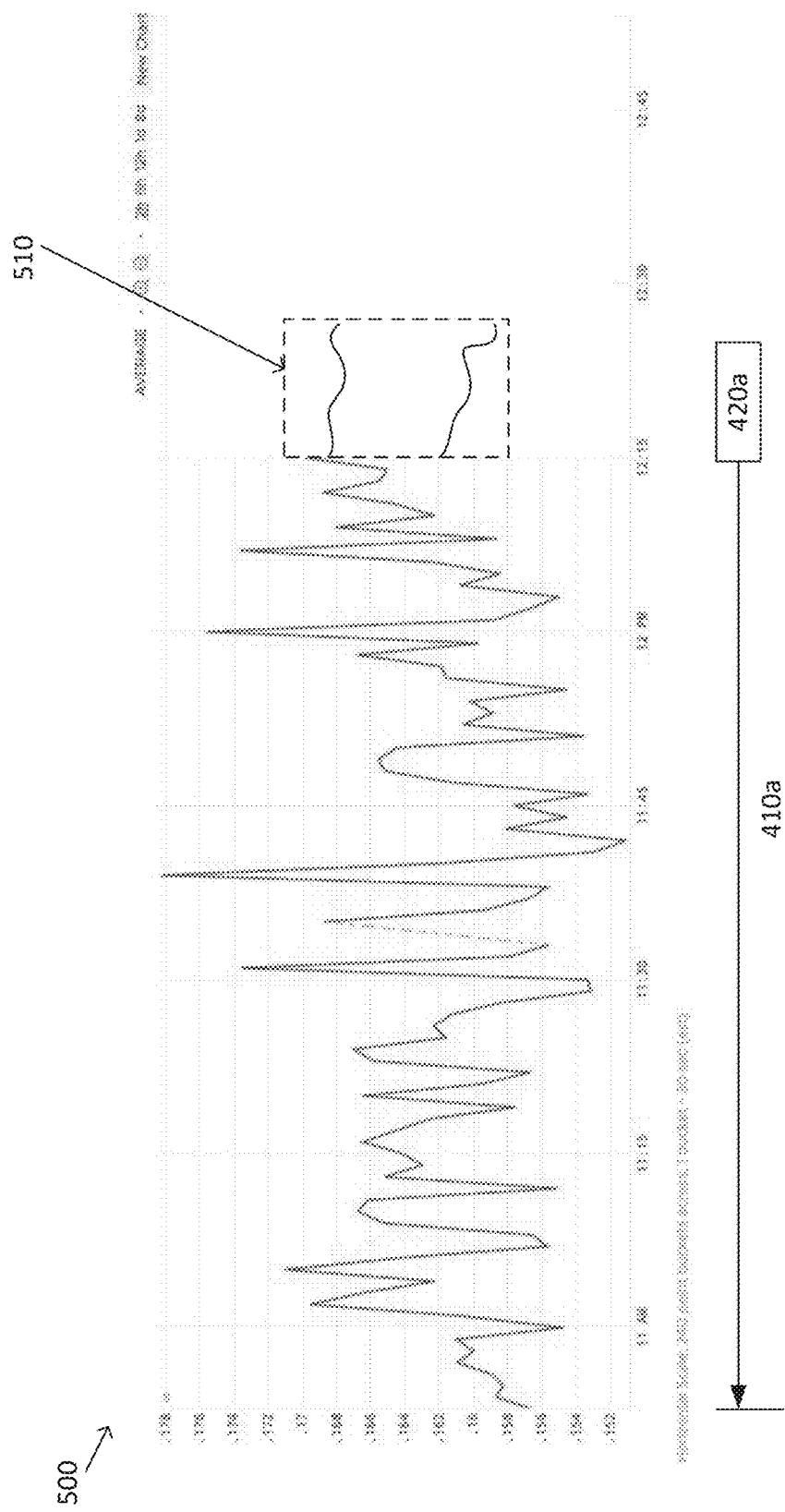
FIG. 5 is a graph of example time series data illustrating a forecast confidence band for a time window, in accordance with embodiments.

FIG. 5 is a graph 500 of example time series data illustrating a forecast confidence band 510 for a time window, in accordance with embodiments. As illustrated, a forecasting algorithm is applied to portion 410a for time window 420a. Forecast confidence band 510 is generated by applying a forecasting algorithm to portion 410a. As illustrated, forecast confidence band includes a lower bound and an upper bound.

Figure 3:
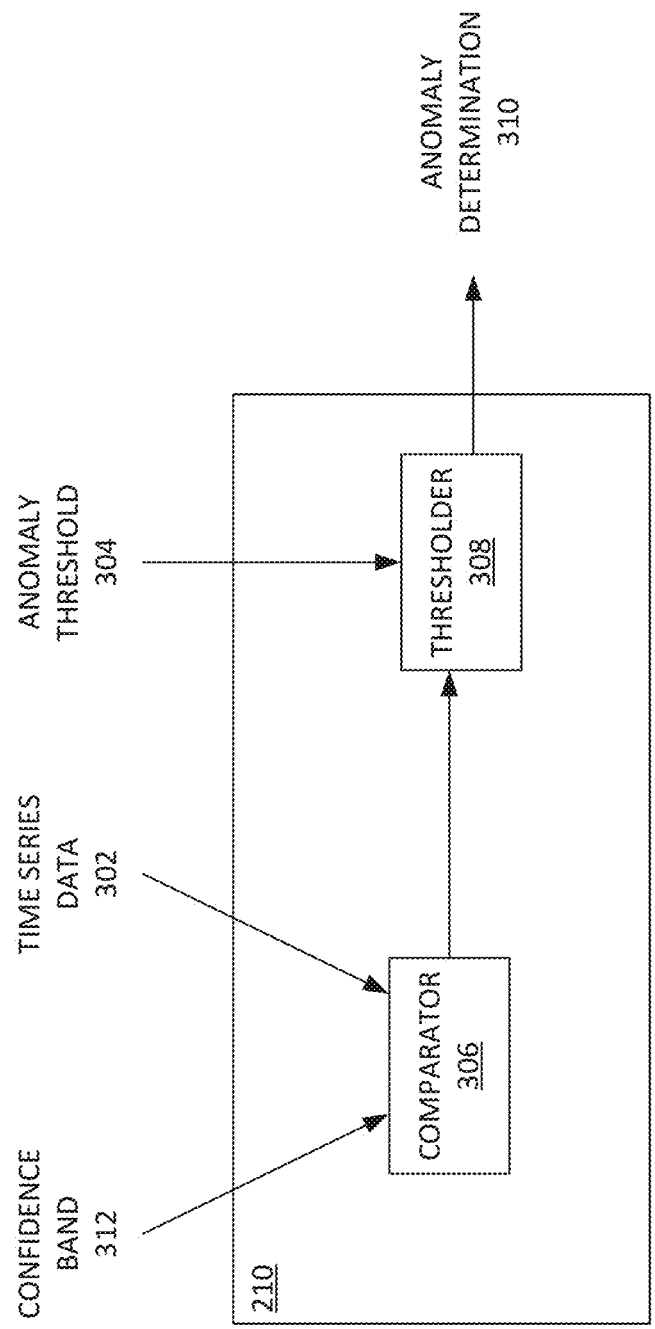
FIG. 3 is a block diagram illustrating an anomaly detector for performing anomaly detection on time series data, in accordance with embodiments.

FIG. 3 is a block diagram illustrating an anomaly detector 210 for performing anomaly detection on time series data, in accordance with embodiments. In one embodiment, comparator 306 of anomaly detector 210 receives time series data 302 and confidence band 312 that is output from time series data forecaster 208. Comparator 306 compares confidence band 312 for a time window to the actual time series data 302 for that time window. In some embodiments, a percentage of points of the time series data falling outside the forecast confidence band for the time window is determined. For example, the percentage can vary from 0.0 to 1.0, where 1.0 indicates that all points are anomalous.

Figure 6:
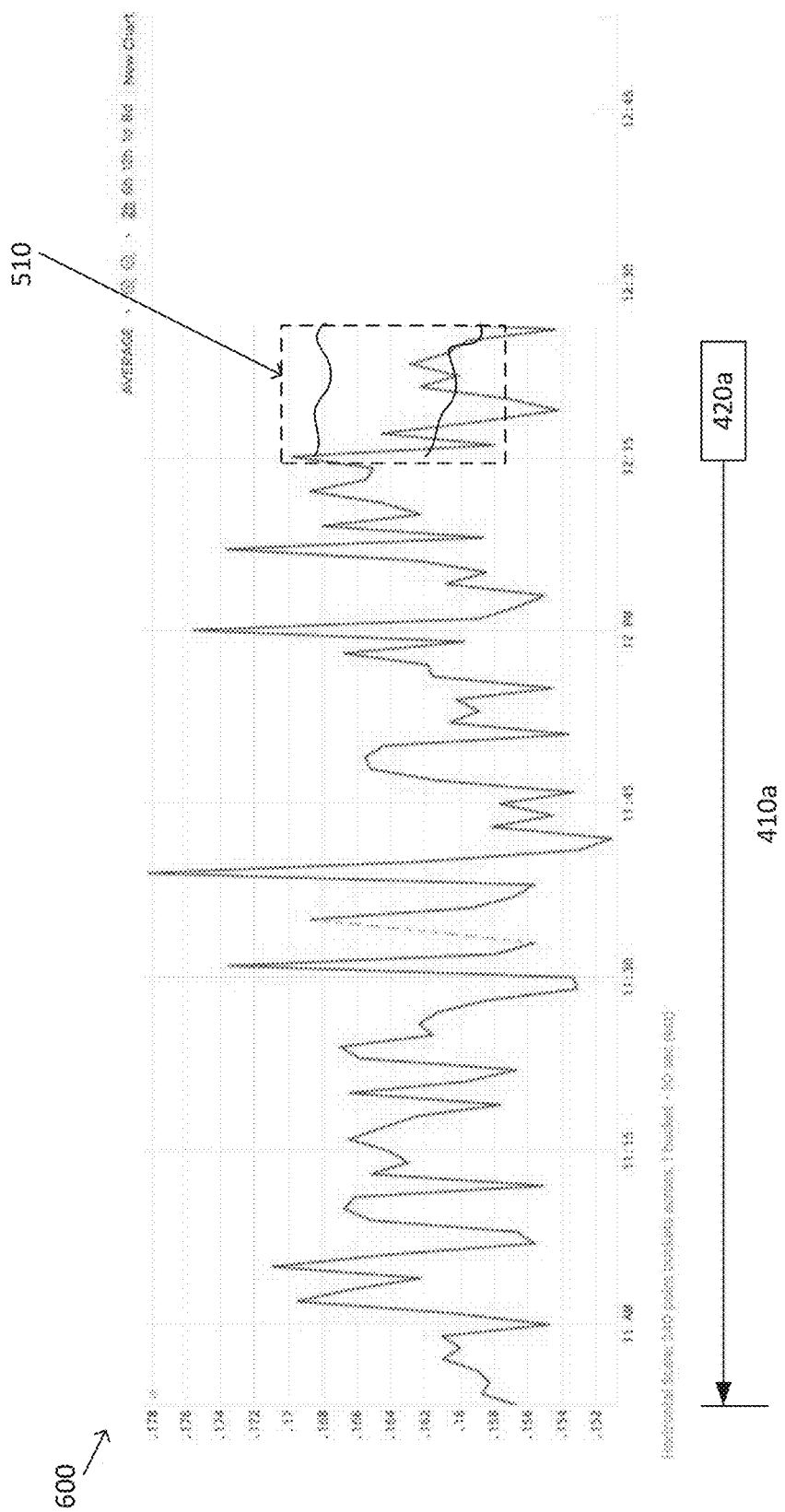
FIG. 6 is a graph of example time series data illustrating a forecast confidence band for a time window and the actual time series data corresponding to the time window, in accordance with embodiments.

FIG. 6 is a graph 600 of example time series data illustrating a forecast confidence band for a time window and the actual time series data corresponding to the time window, in accordance with embodiments. As illustrated, the actual time series data is compared to forecast confidence band 510.

Figure 7:
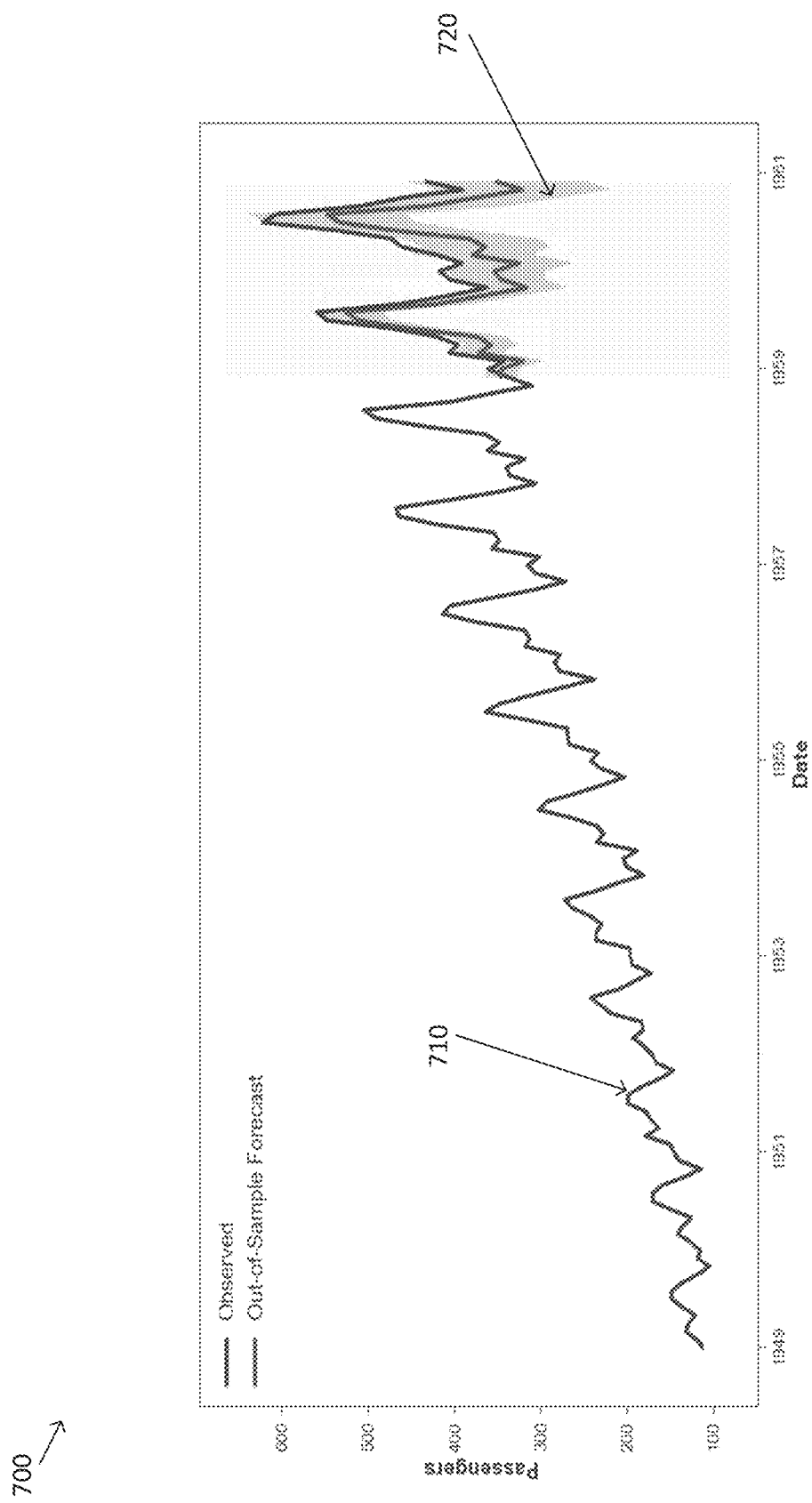
FIG. 7 is a graph of example time series data illustrating a forecast confidence band and the actual time series data corresponding to the forecast confidence band, in accordance with embodiments.

FIG. 7 is a graph 700 of another example time series data illustrating a forecast confidence band and the actual time series data corresponding to the forecast confidence band, in accordance with embodiments. Graph 700 illustrates a forecast confidence band 720 for time series data of air travel passengers over a several year period. A forecasting algorithm is applied to the measured time series data, illustrated as observation 710. For example, the forecasting algorithm generates forecast confidence band 720 based on actual time series data provided by observation 710. As illustrated, forecast confidence band 720 is generated for the range of 1959 through 19661. The actual time series data (observation 710) is compared to forecast confidence band 720 to determine whether the time series data includes any anomalous data.

Thresholder 308 then compares the results of comparator 306 (e.g., percentage of points of the time series data falling outside the forecast confidence band) to anomaly threshold 304. The percentage of points of the time series data falling outside the forecast confidence band can then be compared to a threshold percentage. If the percentage of points outside the bands exceeds the threshold percentage, the method identifies an anomaly of the time series data for the time window, and provides a positive anomaly determination 310. For example, if 80% of the points are anomalous for a 5 minute time window, an anomaly is detected.

It should be appreciated that the forecasting algorithm can be applied to a plurality of portions of the time series data. In some embodiments, the time window following each of the plurality of portions of the time series data has a constant length. The method can periodically apply the forecasting algorithm to a time window following a portion of the time series data. The portions of time series data for which the forecasting algorithm is applied can overlap temporally. For example, the forecasting algorithm can be applied to 7 days of time series data preceding a 10 minute time window every 15 seconds. Each of these operations will generate a forecast confidence band, which is then compared to the actual time series data received for the corresponding time window. If the actual data varies too much compared to the forecast confidence band (e.g., satisfies a percentage threshold), the method automatically identifies an anomaly.

In various embodiments, responsive to determining that the times series data includes an anomaly, an alert 214 is generated at alert generator 212. In some embodiments, a chart of the time series data is presented, where different time series data is presented in different colors. In order to highlight time series data which is determined to be anomalous, in some embodiments, the colors of the individual lines of time series data are suppressed (e.g., converted to gray scale, muted, etc.) for the portions that are not identified as anomalous. As such, only the portion of time series data identified as anomalous are colored, allowing for efficient and specific identification of time series data for further analysis. In some embodiments, as the anomalies are addressed and the time series data becomes non-anomalous, the color of the lines is suppressed, such that only anomalous data is shown.

Figure 8:
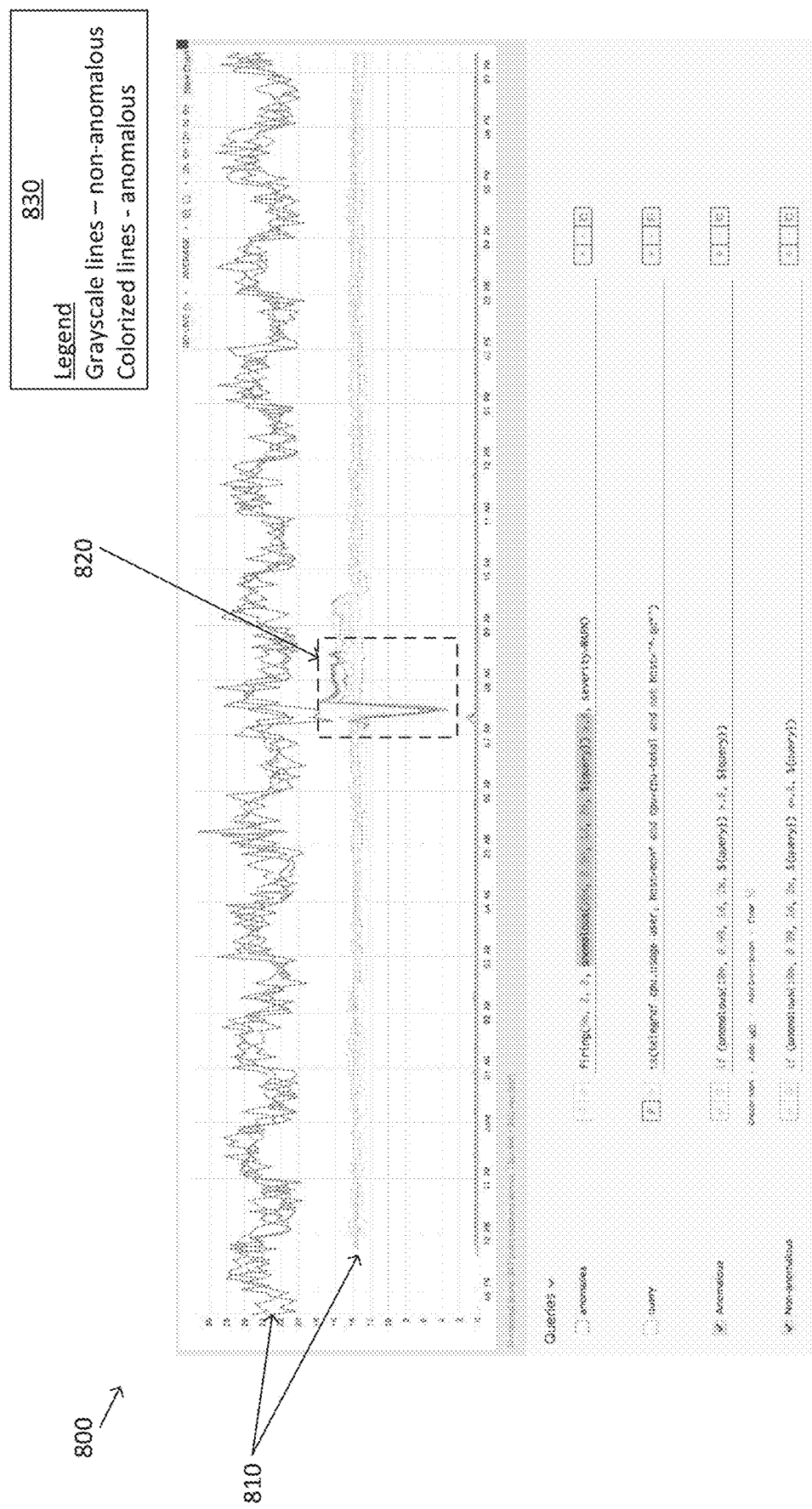
FIG. 8 is a graph of example time series data where visualization of anomalous regions of the time series data are changed relative to the non-anomalous regions of time series data, in accordance with embodiments.

FIG. 8 is a graph 800 of a graphical user interface displaying example time series data where visualization of anomalous regions 820 of the time series data 810 are changed relative to the non-anomalous regions of time series data 810, in accordance with embodiments. In one embodiment, the anomalous regions 820 of the time series data 810 are colorized, wherein the non-anomalous regions of time series data 810 are displayed in grayscale. In one embodiment, a line pattern of the anomalous regions 820 of the time series data 810 is changed (e.g., dashed, dotted, etc.), wherein the non-anomalous regions of time series data 810 are displayed in a different line pattern (e.g., solid line). In one embodiment, a line weight of the anomalous regions 820 of the time series data 810 is changed (e.g., increased or thickened), wherein the non-anomalous regions of time series data 810 are displayed in a different line weight (e.g., no change).

In one embodiment, graph 800 further includes legend 830 for providing information regarding the time series data. For example, as illustrated, legend 830 includes information indicating that grayscale lines of time series data are non-anomalous, while colorized lines include anomalous data. In other embodiments, legend 830 may include additional information directed to particular lines of time series data. For example, legend 830 may include specific colors and an indication as to which time series data is identified by the specific colors.

It should be appreciated that graph 800 can be rendered dynamically, with lines of time series data 810 scrolling across graph 800. Moreover, as graph 800 is rendered dynamically, anomalous regions of time series data 810 are dynamically displayed such that anomalous regions may be removed in response to a determination that the region is no longer anomalous. For example, in such an embodiment, in response to a determination that a region of time series data is no longer anomalous, the visualization of the time series data reverts to the visualization for non-anomalous regions.

Figure 9:
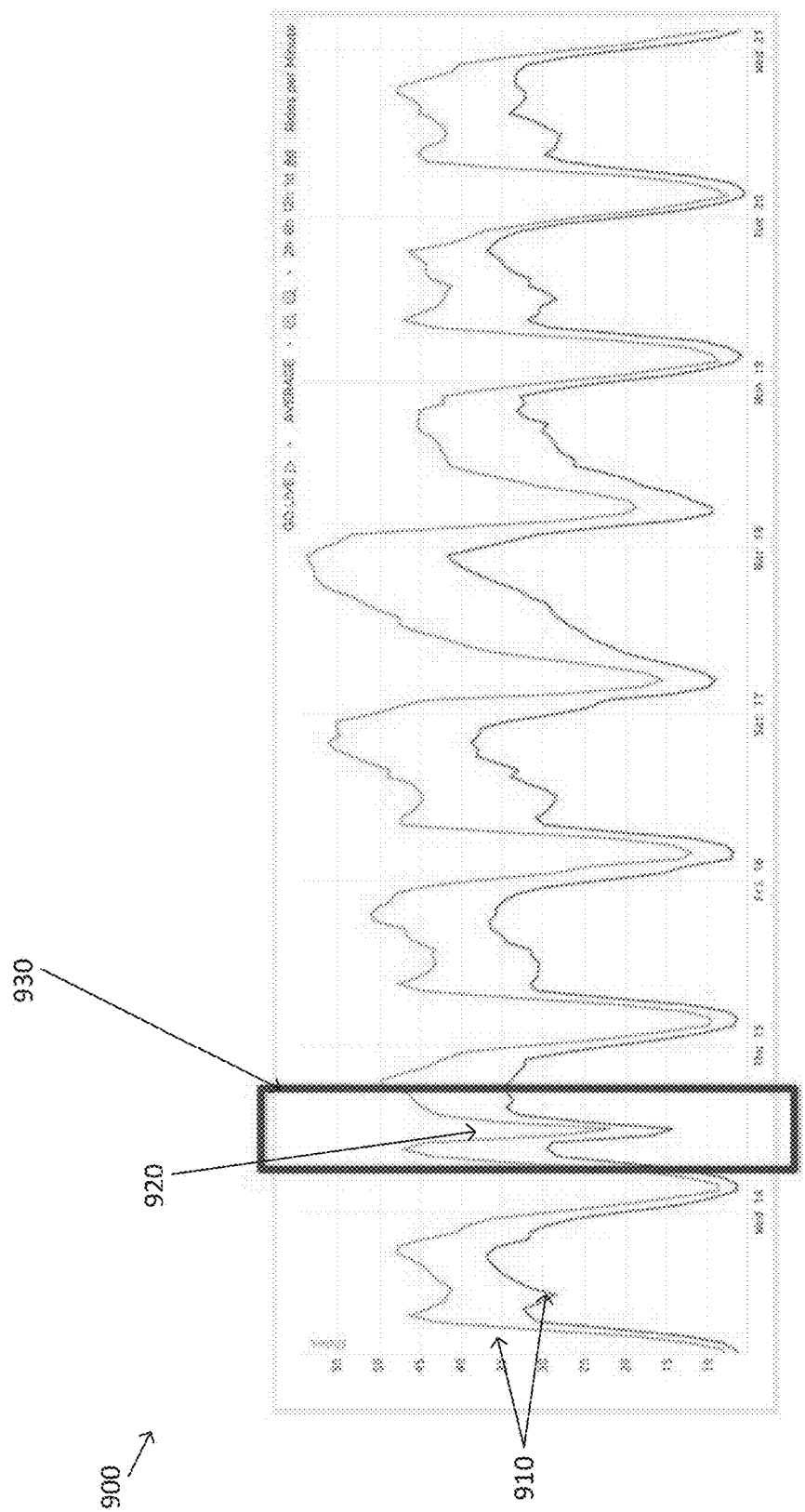
FIG. 9 is a graph of example time series data exhibiting seasonality and illustrating an anomaly, in accordance with embodiments.

FIG. 9 is a graph 900 of a graphical user interface displaying example time series data 910 exhibiting seasonality and including an anomalous region 920, in accordance with embodiments. Graph 900 illustrates time series data 910 of the number of rides of a ridesharing service over a seven day period. Graph 900 illustrates seasonality over a daily period in that ridership is diminished overnight. A forecasting algorithm as applied to the time series data is able to account for seasonality. As illustrated, anomalous region 920 is indicated by box 930. In some embodiments, a background of graph 900 (e.g., the area defined by box 930) is highlighted and/or colorized to call out anomalous region 920.

Hence, the embodiments of the present invention greatly extend beyond conventional methods of anomaly detection of time series data. Moreover, embodiments of the present invention amount to significantly more than merely using a computer to provide a visualization of an anomaly of time series data. Instead, embodiments of the present invention specifically recite a novel process, rooted in computer technology, utilizing a forecasting algorithm to dynamically change the visualization of time series data in response to detecting an anomaly within the time series data to overcome a problem specifically arising in the realm of monitoring time series data within computer systems.

Figure 10:
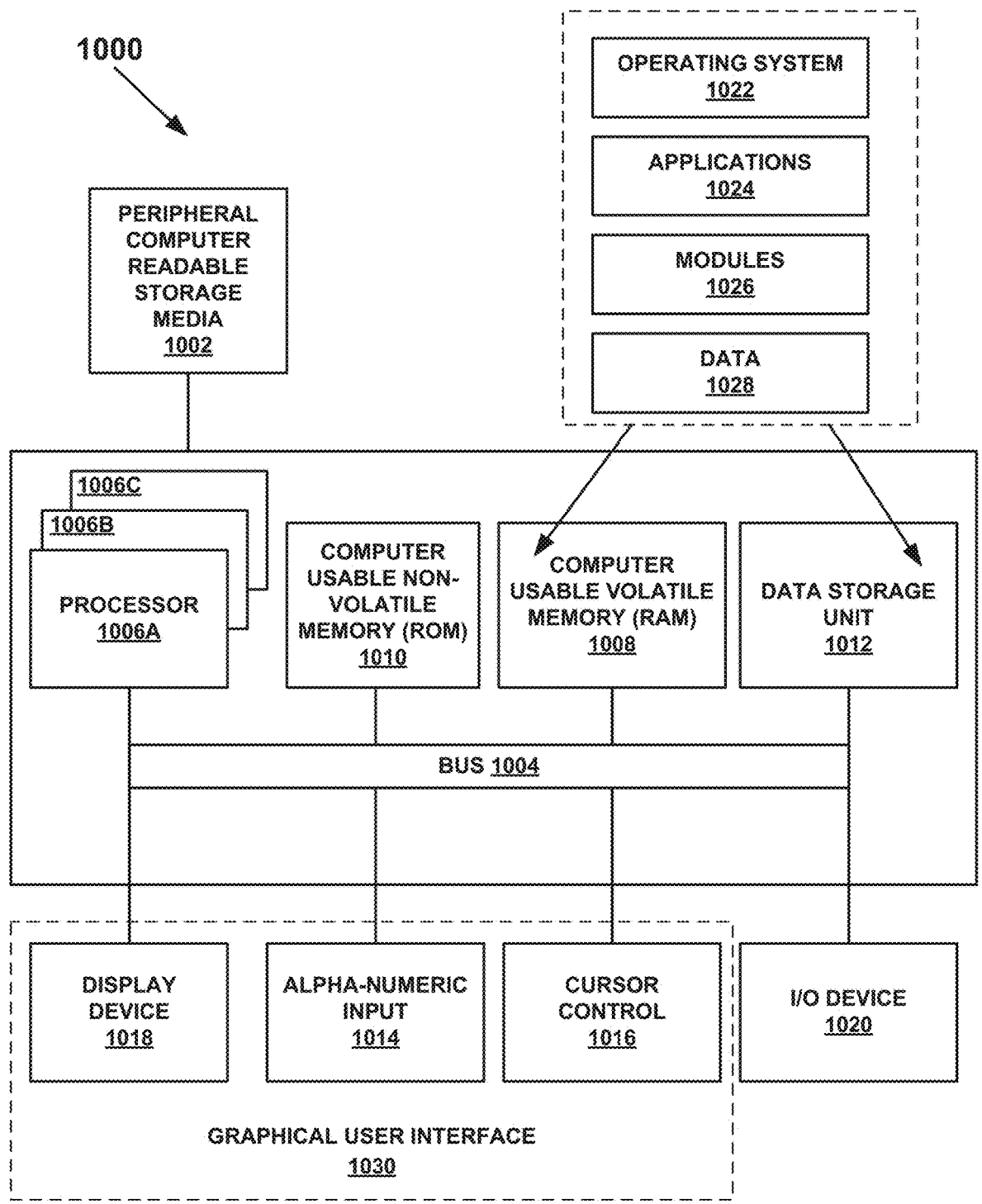
FIG. 10 is a block diagram of an example computer system upon which embodiments of the present invention can be implemented.

FIG. 10 is a block diagram of an example computer system 1000 upon which embodiments of the present invention can be implemented. FIG. 10 illustrates one example of a type of computer system 1000 (e.g., a computer system) that can be used in accordance with or to implement various embodiments which are discussed herein.

It is appreciated that computer system 1000 of FIG. 10 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand-alone computer systems, media centers, handheld computer systems, multi-media devices, and the like. In some embodiments, computer system 1000 of FIG. 10 is well adapted to having peripheral tangible computer-readable storage media 1002 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 1000 of FIG. 10 includes an address/data bus 1004 for communicating information, and a processor 1006A coupled with bus 1004 for processing information and instructions. As depicted in FIG. 10, computer system 1000 is also well suited to a multi-processor environment in which a plurality of processors 1006A, 1006B, and 1006C are present. Conversely, computer system 1000 is also well suited to having a single processor such as, for example, processor 1006A. Processors 1006A, 1006B, and 1006C may be any of various types of microprocessors. Computer system 1000 also includes data storage features such as a computer usable volatile memory 1008, e.g., random access memory (RAM), coupled with bus 1004 for storing information and instructions for processors 1006A, 1006B, and 1006C. Computer system 1000 also includes computer usable non-volatile memory 1010, e.g., read only memory (ROM), coupled with bus 1004 for storing static information and instructions for processors 1006A, 1006B, and 1006C. Also present in computer system 1000 is a data storage unit 1012 (e.g., a magnetic or optical disc and disc drive) coupled with bus 1004 for storing information and instructions. Computer system 1000 also includes an alphanumeric input device 1014 including alphanumeric and function keys coupled with bus 1004 for communicating information and command selections to processor 1006A or processors 1006A, 1006B, and 1006C. Computer system 1000 also includes an cursor control device 1016 coupled with bus 1004 for communicating user input information and command selections to processor 1006A or processors 1006A, 1006B, and 1006C. In one embodiment, computer system 1000 also includes a display device 1018 coupled with bus 1004 for displaying information.

Referring still to FIG. 10, display device 1018 of FIG. 10 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 1016 allows the computer user to dynamically signal the movement of a visible symbol (cursor) on a display screen of display device 1018 and indicate user selections of selectable items displayed on display device 1018. Many implementations of cursor control device 1016 are known in the art including a trackball, mouse, touch pad, touch screen, joystick or special keys on alphanumeric input device 1014 capable of signaling movement of a given direction or manner of displacement. Alternatively, it will be appreciated that a cursor can be directed and/or activated via input from alphanumeric input device 1014 using special keys and key sequence commands. Computer system 1000 is also well suited to having a cursor directed by other means such as, for example, voice commands. In various embodiments, alphanumeric input device 1014, cursor control device 1016, and display device 1018, or any combination thereof (e.g., user interface selection devices), may collectively operate to provide a graphical user interface (GUI) 1030 under the direction of a processor (e.g., processor 1006A or processors 1006A, 1006B, and 1006C). GUI 1030 allows user to interact with computer system 1000 through graphical representations presented on display device 1018 by interacting with alphanumeric input device 1014 and/or cursor control device 1016.

Computer system 1000 also includes an I/O device 1020 for coupling computer system 1000 with external entities. For example, in one embodiment, I/O device 1020 is a modem for enabling wired or wireless communications between computer system 1000 and an external network such as, but not limited to, the Internet. In one embodiment, I/O device 1020 includes a transmitter. Computer system 1000 may communicate with a network by transmitting data via I/O device 1020.

Referring still to FIG. 10, various other components are depicted for computer system 1000. Specifically, when present, an operating system 1022, applications 1024, modules 1026, and data 1028 are shown as typically residing in one or some combination of computer usable volatile memory 1008 (e.g., RAM), computer usable non-volatile memory 1010 (e.g., ROM), and data storage unit 1012. In some embodiments, all or portions of various embodiments described herein are stored, for example, as an application 1024 and/or module 1026 in memory locations within RAM 1008, computer-readable storage media within data storage unit 1012, peripheral computer-readable storage media 1002, and/or other tangible computer-readable storage media.

Example Methods of Operation

Figure 11:
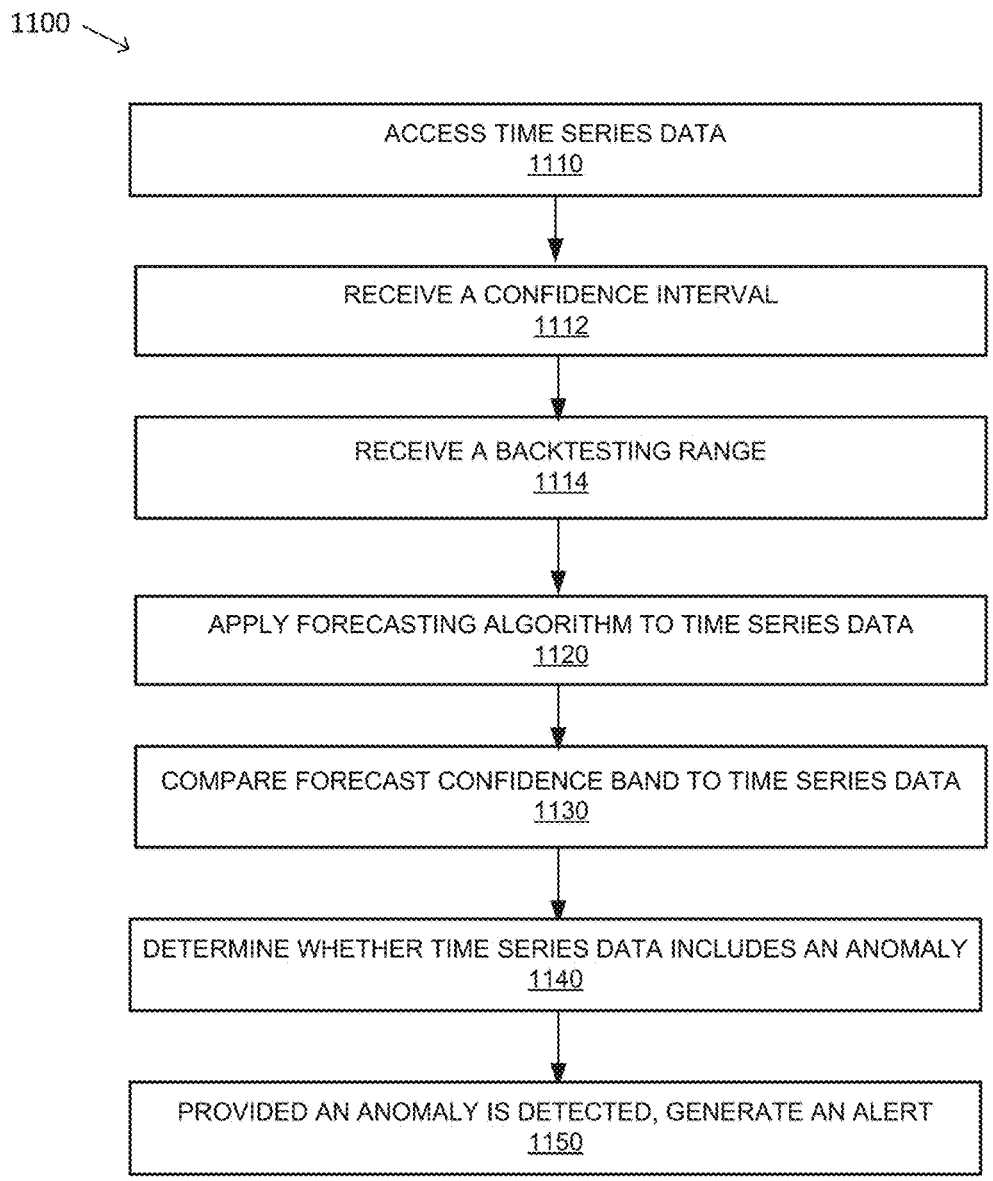
FIG. 11 depicts a flow diagram for anomaly detection on time series data, according to various embodiments.
Figure 12:
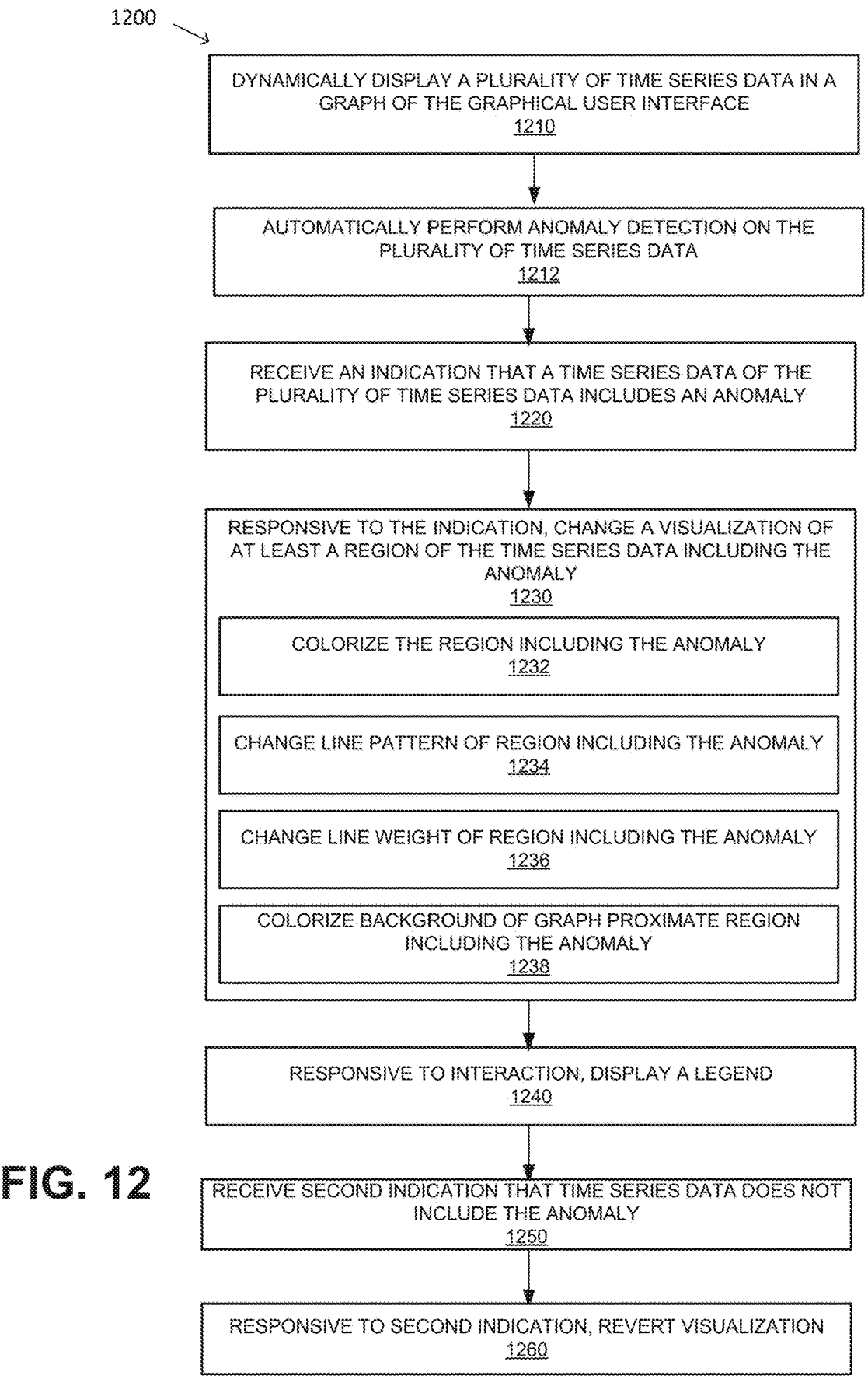
FIG. 12 depicts a flow diagram for visualization of anomalies in time series data on a graphical user interface, according to various embodiments.

The following discussion sets forth in detail the operation of some example methods of operation of embodiments. With reference to FIGS. 11 and 12, flow diagrams 1100 and 1200 illustrate example procedures used by various embodiments. The flow diagrams 1100 and 1200 include some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 1000). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram, such procedures are examples. That is, embodiments are well suited to performing various other procedures or variations of the procedures recited in the flow diagram. Likewise, in some embodiments, the procedures in flow diagrams 1100 and 1200 may be performed in an order different than presented and/or not all of the procedures described in flow diagrams 1100 and 1200 may be performed. It is further appreciated that procedures described in flow diagrams 1100 and 1200 may be implemented in hardware, or a combination of hardware with firmware and/or software provided by computer system 1000.

FIG. 11 depicts a flow diagram 1100 for anomaly detection on time series data, according to various embodiments. At procedure 1110 of flow diagram 1100, time series data is accessed. In one embodiment, as shown at procedure 1112, a confidence interval for the forecasting algorithm is received. In one embodiment, as shown at procedure 1114, a backtesting range for the forecasting algorithm is received At procedure 1120, a forecasting algorithm is applied to at least a portion of the time series data to generate a forecast confidence band for a time window following the at least a portion of the time series data. In one embodiment, the forecasting algorithm is applied according to at least one of the confidence interval and the backtesting range. In one embodiment, applying the forecasting algorithm to at least a portion of the time series data is performed for a plurality of portions of the time series data. In one embodiment, the time window following each of the portions of the time series data has a constant length. In one embodiment, the plurality of portions of the time series data overlap temporally.

At procedure 1130, the forecast confidence band for the time window is compared to the time series data of the time window. In one embodiment, a percentage of points of time series data falling outside the forecast confidence band for the time window is determined.

At procedure 1140, it is determined whether the time series data includes an anomaly based at least in part on the comparing. In one embodiment, it is determined whether the percentage of points of the time series data falling within the forecast confidence band for the time window satisfies a threshold percentage. Provided the percentage of points of the time series data falling within the forecast confidence band for the time window exceeds the threshold percentage, an anomaly of the time series data for the time window is identified In one embodiment, as shown at procedure 1150, provided an anomaly is detected, an alert is generated. In one embodiment, the alert includes colorizing a graphical representation of the anomalous data while muting a graphical representation of the non-anomalous data.

FIG. 12 depicts a flow diagram 1200 for visualization of anomalies in time series data on a graphical user interface, according to various embodiments. At procedure 1210 of flow diagram 1200, a plurality of time series data is dynamically displayed in a graph of the graphical user interface, where the time series data includes data points represented as numerical measurements. In one embodiment, as shown at procedure 1212, anomaly detection is automatically performed on the plurality of time series data. In some embodiments, the anomaly detection is performed in accordance with flow diagram 1100 of FIG. 11.

At procedure 1220, an indication that a time series data of the plurality of time series data includes an anomaly is received. At procedure 1230, responsive to receiving the indication that the time series data of the plurality of time series data includes an anomaly, a visualization of at least a region of the time series data including the anomaly is changed. In one embodiment, the plurality of time series data not including the anomaly is displayed in grayscale.

In some embodiments, regions of time series data not including an anomaly use a first visualization setting and regions of time series data including an anomaly use a second visualization setting. In one embodiment, the first visualization setting includes grayscale rendering and the second visualization setting includes colorized rendering. In another embodiment, the first visualization setting includes a first line pattern and the second visualization setting includes a second line pattern. In another embodiment, the first visualization setting includes a first line weight and the second visualization setting includes a second line weight.

In one embodiment, as shown at procedure 1232, the region of the time series data including the anomaly is colorized, wherein the plurality of time series data not including the anomaly are displayed in grayscale. In one embodiment, as shown at procedure 1234, a line pattern of the region of the time series data including the anomaly is changed, wherein the plurality of time series data not including the anomaly are displayed in a different line pattern. In one embodiment, as shown at procedure 1236, a line weight of the region of the time series data including the anomaly is changed, wherein the plurality of time series data not including the anomaly are displayed in a different line weight. In one embodiment, as shown at procedure 1238, a background region of the graph proximate the region of the time series data including the anomaly is colorized.

In one embodiment, as shown at procedure 1240 responsive to detecting an interaction with the region of the time series data including the anomaly, a legend including information regarding the time series data including the anomaly is displayed.

In one embodiment, as shown at procedure 1250, a second indication that the time series data does not include the anomaly is received. At procedure 1260, responsive to receiving the second indication that the time series data does not include an anomaly, the visualization of the at least a region of the time series data is reverted. In one embodiment, the visualization of the at least a region of the time series data is reverted to the first visualization setting.

It is noted that any of the procedures, stated above, regarding the flow diagram of FIGS. 11 and 12 may be implemented in hardware, or a combination of hardware with firmware and/or software. For example, any of the procedures are implemented by a processor(s) of a cloud environment and/or a computing environment.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible, regardless the degree of virtualization. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method for visualization of anomalies in time series data on a graphical user interface, the method comprising:
   dynamically displaying a plurality of time series data in a graph of the graphical user interface, the plurality of time series data comprising data points represented as numerical measurements;
   receiving an indication that a time series data of the plurality of time series data comprises an anomaly;
   responsive to receiving the indication that the time series data of the plurality of time series data comprises an anomaly, changing a visualization of at least a region of the time series data comprising the anomaly;
   receiving a second indication that the time series data does not comprise the anomaly; and
   responsive to receiving the second indication that the time series data does not comprise an anomaly, reverting the visualization of the at least a region of the time series data.

2. The computer-implemented method of claim 1, wherein the changing the visualization of at least a region of the time series data comprising the anomaly comprises:
   colorizing the region of the time series data comprising the anomaly, wherein the plurality of time series data not comprising the anomaly are displayed in grayscale.

3. The computer-implemented method of claim 1, wherein the changing the visualization of at least a region of the time series data comprising the anomaly comprises:

changing a line pattern of the region of the time series data comprising the anomaly, wherein the plurality of time series data not comprising the anomaly are displayed in a different line pattern.

4. The computer-implemented method of claim 1, wherein the changing the visualization of at least a region of the time series data comprising the anomaly comprises:
colorizing a background region of the graph proximate the region of the time series data comprising the anomaly.

5. The computer-implemented method of claim 1, further comprising:
responsive to detecting an interaction with the region of the time series data comprising the anomaly, displaying a legend comprising information regarding the time series data comprising the anomaly.

6. The computer-implemented method of claim 1, wherein the plurality of time series data not comprising the anomaly are displayed in grayscale.

7. The computer-implemented method of claim 1, the method further comprising:
automatically performing anomaly detection on the plurality of time series data.

8. The computer-implemented method of claim 7, wherein the automatically performing anomaly detection on the plurality of time series data comprises:
for a time series data of the plurality of time series data:
accessing the time series data;
applying a forecasting algorithm to at least a portion of the time series data to generate a forecast confidence band for a time window following the at least a portion of the time series data;
comparing the forecast confidence band for the time window to the time series data of the time window; and
determining whether the time series data comprises an anomaly based at least in part on the comparing.

9. A non-transitory computer readable storage medium having computer readable program code stored thereon for causing a computer system to perform a method for visualization of anomalies in time series data on a graphical user interface, the method comprising:
dynamically displaying a plurality of time series data in a graph of the graphical user interface, the plurality of time series data comprising data points represented as numerical measurements, wherein the plurality of time series data are displayed according to a first visualization setting;
automatically performing anomaly detection on the plurality of time series data;
receiving an indication that a time series data of the plurality of time series data comprises an anomaly;
responsive to receiving the indication that the time series data of the plurality of time series data comprises an anomaly, changing a visualization setting of a region of the time series data comprising the anomaly to a second visualization setting;
receiving a second indication that the time series data does not comprise the anomaly; and
responsive to receiving the second indication that the time series data does not comprise an anomaly, reverting the visualization setting of the at least a region of the time series data to the first visualization setting.

10. The non-transitory computer readable storage medium of claim 9, wherein the first visualization setting comprises grayscale rendering and the second visualization setting comprises colorized rendering.

11. The non-transitory computer readable storage medium of claim 9, wherein the first visualization setting comprises a first line pattern and the second visualization setting comprises a second line pattern.

12. The non-transitory computer readable storage medium of claim 9, wherein the first visualization setting comprises a first line weight and the second visualization setting comprises a second line weight.

13. The non-transitory computer readable storage medium of claim 9, wherein the changing the visualization of the region of the time series data comprising the anomaly comprises:
colorizing a background region of the graph proximate the region of the time series data comprising the anomaly.

14. The non-transitory computer readable storage medium of claim 9, the method further comprising:
responsive to detecting an interaction with the region of the time series data comprising the anomaly, displaying a legend comprising information regarding the time series data comprising the anomaly.

15. The non-transitory computer readable storage medium of claim 9, wherein the automatically performing anomaly detection on the plurality of time series data comprises:
for a time series data of the plurality of time series data:
accessing the time series data;
applying a forecasting algorithm to at least a portion of the time series data to generate a forecast confidence band for a time window following the at least a portion of the time series data;
comparing the forecast confidence band for the time window to the time series data of the time window; and
determining whether the time series data comprises an anomaly based at least in part on the comparing.

16. A computer system comprising:
a graphical user interface;
a display device;
a user interface selection device; and
one or more processors configured to:
provide the graphical user interface for rendering on the display device, the graphical user interface comprising:
a graph comprising a plurality of time series data comprising data points represented as numerical measurements;
receive an indication that a time series data of the plurality of time series data comprises an anomaly;
responsive to receiving the indication that the time series data of the plurality of time series data comprises an anomaly, colorize a region of the time series data comprising the anomaly, wherein the plurality of time series data not comprising the anomaly are displayed in grayscale;
receive a second indication that the time series data does not comprise the anomaly; and
responsive to receiving the second indication that the time series data does not comprise an anomaly, revert the region of the time series data to grayscale.

17. The computer system of claim 16, wherein the one or more processors are further configured to:
automatically perform anomaly detection on the plurality of time series data.

* * * * *